(12) United States Patent
Obara et al.

(10) Patent No.: US 6,734,590 B2
(45) Date of Patent: May 11, 2004

(54) MOTOR

(75) Inventors: Rikuro Obara, Miyota-machi (JP); Akio Okamiya, Miyota-machi (JP)

(73) Assignee: Minebea Co., Ltd., Miyota (JP)

( * ) Notice: Subject to any disclaimer, the term of this patent is extended or adjusted under 35 U.S.C. 154(b) by 0 days.

(21) Appl. No.: 10/123,228

(22) Filed: Apr. 17, 2002

(65) Prior Publication Data
US 2002/0163268 A1 Nov. 7, 2002

(30) Foreign Application Priority Data
Apr. 17, 2001 (JP) ........................................ 2001-118522
Apr. 17, 2002 (JP) ........................................ 2002-115035

(51) Int. Cl.[7] ................................................. H02K 5/16
(52) U.S. Cl. ........................................ 310/90; 310/67 R
(58) Field of Search ....................... 310/90, 90.5, 67 R; 384/100, 113, 114

(56) References Cited

U.S. PATENT DOCUMENTS

| | | | | |
|---|---|---|---|---|
| 4,604,665 A | * | 8/1986 | Muller et al. ............ | 360/97.02 |
| 5,469,008 A | * | 11/1995 | Nakajima et al. .......... | 310/90.5 |
| 5,541,462 A | * | 7/1996 | Nii et al. ........................ | 310/90 |
| 5,574,322 A | * | 11/1996 | Nii et al. ................... | 310/90.5 |
| 6,097,121 A | * | 8/2000 | Oku ............................. | 310/91 |
| 6,316,856 B1 | * | 11/2001 | Kusaki et al. ................. | 310/90 |
| 6,339,270 B1 | * | 1/2002 | Ichiyama ................... | 310/67 R |

* cited by examiner

Primary Examiner—Thanh Lam
(74) Attorney, Agent, or Firm—Oliff & Berridge, PLC

(57) ABSTRACT

A motor that can prevent damages on the fluid dynamic bearing. A ball is press-fitted into the end surface of the shaft body, and the ball is disposed in such a manner that the tip portion of the ball comes to the higher position with respect to the end surface of the annular body. When the shaft is at rest, the ball abuts against the upper surface of the counter plate, and the end surface of the annular body is brought into a state of being raised from the upper surface of the counter plate, so that the situation in which the end surface of the annular body and the upper surface of the counter plate are brought into almost fully touch each other can be avoided. Therefore, when the operation is started, the circulation speed of a fluid increases and a fluid layer is quickly formed. As a consequent, the fluid circularity blocking action, which could be occurred in the relate art, is avoided, and generation of scratch caused by starting rotation in the tightly sticked state can be positively prevented.

10 Claims, 13 Drawing Sheets

MOTOR

BACKGROUND OF THE INVENTION

1. Field of the Invention

The present invention relates to a motor for driving magnetic disks such as a spindle motor used in the hard disk drive device of the computer.

2. Description of the Related Art

Recently, the field of the hard disk drive device has been making steady progress in increasing capacity thereof. In order to optimize such a progress in increasing capacity, there is a growing need for higher rotational speed for the motor used in the hard disk drive device. As a bearing for such a motor, a ball bearing has been generally used so far. However, in order to optimize the need for higher rotational speed, application of fluid dynamic bearings has been introduced.

As an example of the motor used in the hard disk drive device and comprising a fluid dynamic bearing, there is shown in FIG. 20 a spindle motor for driving magnetic disks. The spindle motor 1 for driving magnetic disks (hereinafter, referred to as a spindle motor) is provided with a magnet 5 on the rotor 4 so as to face toward the stator 3 provided on the flange 2.

The flange 2 generally comprises a flange body 6 for holding the stator 3, and a sleeve 7 to be press-fitted into the hole (sleeve fitting hole 6a) formed on the flange body 6.

The sleeve 7 generally comprises a cylindrical sleeve body 9 and a disk-shaped counter plate 11.

The sleeve body 9 comprises a hole (no reference numeral is assigned) extending from one side (the upper side in FIG. 20) to the other side (the lower side in FIG. 20) for inserting a shaft 12 therein, and the hole is constructed of a hole formed on one side (hereinafter, referred to as a sleeve hole) 7a and an annular stepped portion 8 formed concentrically and in communication with the sleeve hole 7a via a step.

As shown in FIG. 21 and FIG. 22, the annular stepped portion 8 comprises an annular hole 8a having a larger inner diameter in comparison with the sleeve hole 7a and formed in communication with the sleeve hole 7a via a step (hereinafter, referred to as a medium diameter annular hole), and an annular hole having a larger inner diameter in comparison with the medium diameter annular hole 8a and formed in communication with the medium diameter annular hole 8a via a step hereinafter, referred to as large diameter annular hole). The large diameter annular hole 8b opens at one end (the lower side in FIG. 21) of the sleeve body 9. The counter plate 11 is disposed at the large diameter annular hole 8b, and the counter plate 11 and the sleeve body 9 are hermetically connected by welding or the like.

The shaft 12 comprises a shaft body 12a, and an annular body 10 fitted on one end (the lower portion in FIG. 20) of the shaft body 12a. The annular body 10 of the shaft 12 is disposed in the medium diameter annular hole 8a and the shaft body 12a of the shaft 12 is inserted into the sleeve hole 7a.

As described above, the annular body 10 of the shaft 12 is disposed in the medium annular hole 8a and the shaft body 12a of the shaft 12 is inserted into the sleeve hole 7a, and the sleeve 7 constitutes a fluid dynamic bearing 13 with the shaft 12. Though oil 14 is generally used as a fluid for the fluid dynamic bearing 13, it may be constructed to use gas such as air.

In other words, a plurality of rows of groves 15 are formed on the inner wall (sleeve hole 7a) of the sleeve body 9, and a plurality of rows of grooves (not shown) are formed on the end portion of the annular body 10 that touches the stepped wall surface of the medium annular hole 8a of the sleeve body 9 and the portion of the upper surface of the counter plate 11 that touches the annular body 10. Oil 14 is filled and reserved in the gap between the sleeve 7 including the grooves 15 and the shaft 12, and in the grooves that are not shown in the figure. The inner peripheral surface of the annular body 10 is formed with a fluid circulating groove 10a so as to facilitate circulation of the fluid. The annular body 10 slightly projects toward the counter plate 11 with respect to the shaft 12, so as to facilitate inflow and outflow of fluid from and to the fluid circulating groove 10a.

The annular body 10 of the shaft 12 is disposed at the medium diameter annular hole 8a, that is, between the wall surface of the medium diameter annular hole 8a that faces in the axial direction (the upper side in FIG. 20) and the counter plate 11, so that the axial movement (vertical movement in FIG. 20) of the shaft 12 is controlled via the annular body 10.

The dynamic pressure generated by the pumping action in association with rotation of the shaft 12 forces a fluid layer to be formed between the sleeve 7 and the shaft 12, and the shaft 12 that touched the counter plate 11 as shown in FIG. 21 during the rest time rises from the counter plate 11 as shown in FIG. 22, so that the shaft 12 can rotate with respect to the sleeve 7 via the fluid layer. The fluid dynamic bearing 13 forms a fluid layer by the dynamic pressure and forms a gap between the shaft 12 and the counter plate 11 to support a thrust load of the shaft 12 as described above [in other words, the counter plate 11 supports a thrust load applied downwardly of the shaft 12 (in the direction of the arrow D in FIG. 20), and the ceiling wall of the medium diameter annular hole portion 8a supports a thrust load applied upwardly of the shaft 12 (annular body 10) (in the direction of the arrow U in FIG. 20)], and a radial load of the shaft 12 is supported by the portion of the sleeve 7 where the sleeve hole 7a is formed.

Referring now to FIG. 21 and FIG. 22, the operation of the fluid dynamic bearing of the related art will be described.

FIG. 22 shows a state in which the 12 is rotated and the dynamic pressure of a fluid is generated.

In FIG. 22, when the spindle motor 1 is actuated and the shaft 12 starts rotating, the dynamic pressure is generated and thus a fluid layer is formed in the gap formed between the inner diameter surface of the sleeve 7 that is a fixed body and the outer peripheral surface of the shaft 12 that is a rotating body, between the stepped end surface (annular stepped portion 8) of the sleeve 7 and the opposing end surface of the annual body 10, between the wall surface of the medium diameter annular hole 8a of the sleeve 7 and the outer diameter surface of the annular body 10, and between the upper surface 11a (inner end surface) of the counter plate 11 that is fitted into the sleeve 7 and the end surface 10b of the annular body 10 and the end surface 12b of the shaft body 12a, so that the rotating portion can rotate without touching the stationary portion, thereby forming a fluid dynamic bearing.

In FIG. 22, G07 designates an axial distance of the gap formed between the end surface 10b of the annular body 10 and the upper surface 11a of the counter plate 11 when the rotor 4 (shaft 12) is rotated at a specified rotational speed.

FIG. 21 shows that state of the end portion of the shaft when the spindle motor 1 is oriented in such a manner that the counter plate 11 faces downward when the rotation of the shaft 12 is stopped and remained at rest.

In FIG. 21, loads of the hub 32, the yolk 41, and the magnet 5 assembled to the shaft 12 shown in FIG. 20 are applied downward, and thus the shaft 12 on which the annular body 10 is fitted moves downward, whereby the end surface 10b of the annular body 10 touches the upper surface 11a of the counter plate 11 via a thin fluid layer. Since the fluid layer interposed between the upper surface 11a of the counter plate 11 and the end surface 10b of the annular body 10 is extremely thin, a gap G17 between the upper surface 11a of the counter plate 11 and the end surface 10b of the annular body 10 becomes extremely small value, or otherwise they may touch each other.

In the spindle motor 1, as shown in FIG. 20, when the shaft 12 is oriented in the vertical direction and disposed on the counter plate 11, a load is applied to the lower end of the shaft 12, and thus when an impact or vibrations is applied, the fluid layer on the contact surface is susceptible to mechanical damages such as breakage or scratch.

For example, when rotation of the shaft 12 is started, so-called fluid circularity blocking action is effected because circulation of a fluid is slow due to narrow gap G17. As a consequence, the fluid layer cannot be formed quickly, and thus the body of revolution (shaft 12) cannot rise quickly or sufficiently, which may result in difficulty in performing the function of the fluid layer as a fluid dynamic bearing. In a state where the shaft 12 is not rotating, there is no rising action on effected by the fluid dynamic pressure, and thus the lower end surface of the shaft 12 (the end surface 10b of the annular body 10) touches the upper surface 11a of the counter plate 11 as shown in FIG. 21, which results in scratch on both contact surfaces.

Especially, during transportation or handling, it is susceptible to a large impact. In such a case, damages on the contact surface may increase and may cause failure in the performance of the apparatus.

SUMMARY OF THE INVENTION

In view of such circumstances, it is an object of the present invention to provide a motor that can prevent damages to the fluid dynamic bearing.

A motor according to the first aspect of the present invention has a rotating member supported on a stationary portion via a fluid dynamic bearing for supporting both of a thrust load and a radial load, and comprises one or more projections provided on one of the opposing generally flat surfaces at the end of the shaft of the fluid dynamic bearing each as a separate unit, wherein the projections are capable of abutting against the other surface when the rotating member is at rest.

Preferably, one of the surfaces is an end surface of the shaft provided on the rotating member and the other one of the surfaces is the portion on the surface of the stationary portion facing toward the end surface of the shaft, or one of the surfaces is the portion on the surface of the stationary portion facing toward the end surface of the shaft and the other one of the surfaces is an end surface of the shaft.

A motor according to the second aspect of the present invention comprises a shaft fitted with an annular body on one end of the shaft body, a rotating member supported on the stationary portion via a fluid dynamic bearing for supporting both of a thrust load and a radial load, and one or more projections provided on the end surface of the shaft body each as a separate unit, wherein the projection is provided in such a manner that the tip portion thereof comes to the position higher than the end surface of the annular body.

A motor according to the third aspect of the present invention comprises a shaft fitted with an annular body on one end of the shaft body, a rotating member supported on the stationary portion via a fluid dynamic bearing for supporting both of a thrust load and a radial load, and one or more projections provided on the end surface of the annular body each as a separate unit.

A motor according to the forth aspect of the present invention comprises a shaft fitted with an annular body on one end of the shaft body, a rotating member supported on the stationary portion via a fluid dynamic bearing for supporting both of a thrust load and a radial load, and one or more projections provided on the portion on the surface of the stationary portion facing toward the end surface of the annular body each as a separate unit.

A motor according to the fifth aspect of the present invention comprises a shaft fitted with an annular body on one end of the shaft body, a rotating member supported on the stationary portion via a fluid dynamic bearing for supporting both of a thrust load and a radial load, and one or more projections provided on the portion on the surface of the stationary portion facing toward the end surface of the shaft each as a separate unit, wherein the height of the projection from the mounted portion is larger than the distance from the end surface of the shaft body to the end surface of the annular body.

Preferably, the projection is press-fitted into the member on which the projection is to be provided.

Preferably, the projection has a spherical shape.

Preferably, the projection is formed of ceramic.

Preferably, the projection is a member made of a high hardness material formed by a sputtering.

Preferably, the member is formed of a base member containing silicon or chromium as a component and a secondary member made of a high hardness material placed thereon, and both of the members are formed by the sputtering.

Preferably, the member made of a high hardness material is amorphous carbon or DLC (Diamond-like Carbon).

DESCRIPTION OF THE PREFERRED EMBODIMENTS

Figure 1:
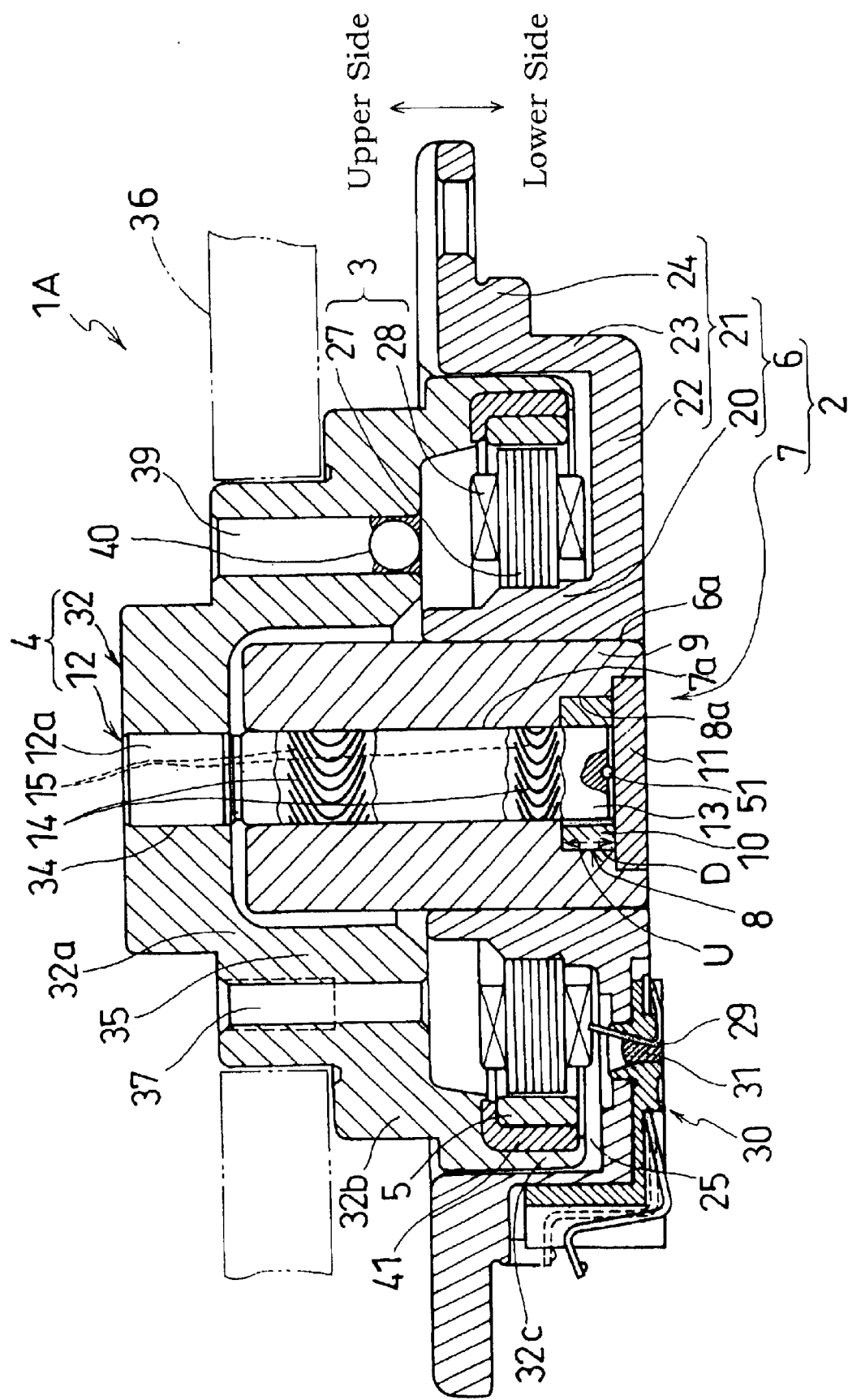
FIG. 1 is a cross sectional view showing an embodiment of the present invention.
Figure 2:
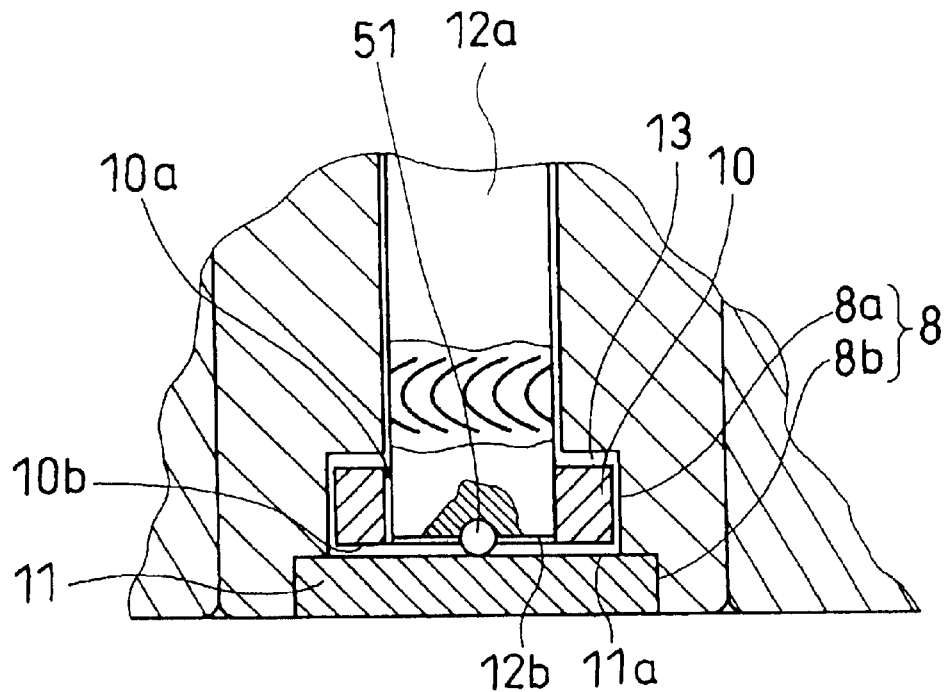
FIG. 2 is a cross sectional view showing a spindle motor shown in FIG. 1 remained at rest.
Figure 3:
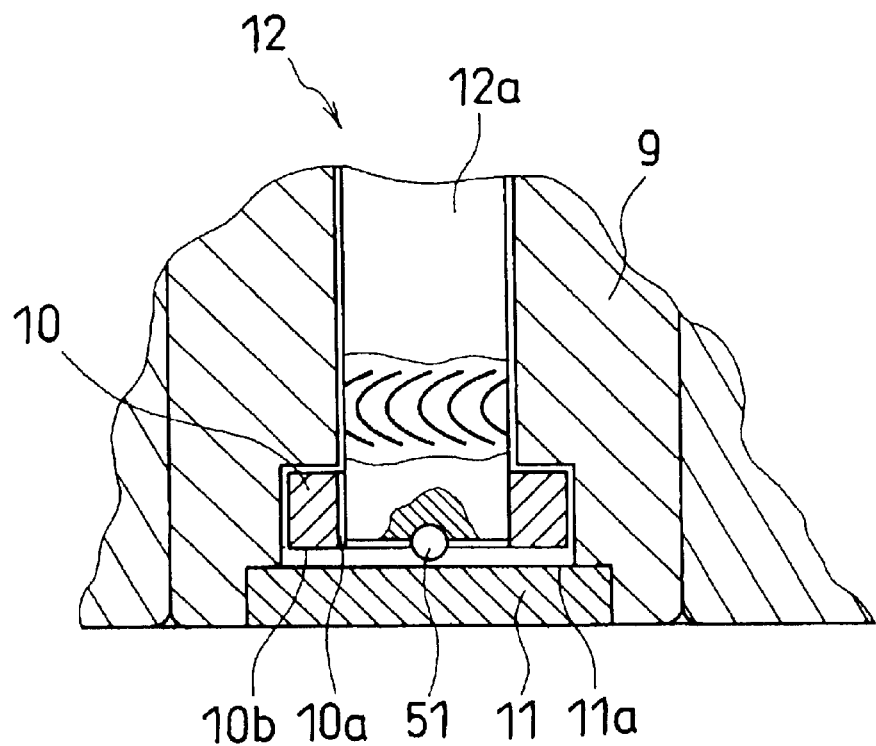
FIG. 3 is a cross sectional view of the spindle motor shown in FIG. 1 in the state of being rotated.

Referring now to FIGS. 1 to 3, a first embodiment of the present invention will be described. The first embodiment corresponds to the second aspect of the present invention.

Figure 20:
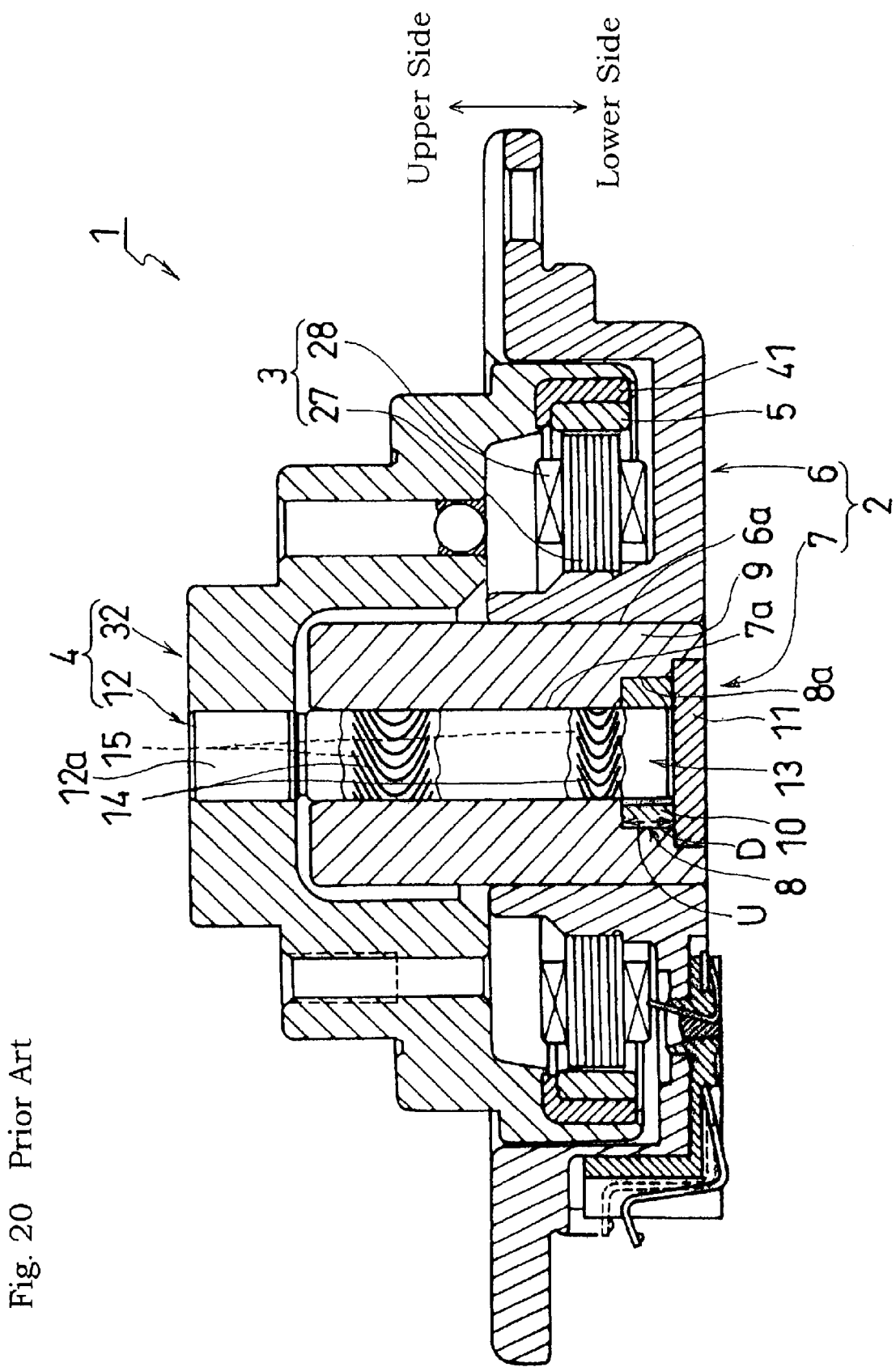
FIG. 20 is a cross sectional view showing an example of the conventional spindle motor.
Figure 21:
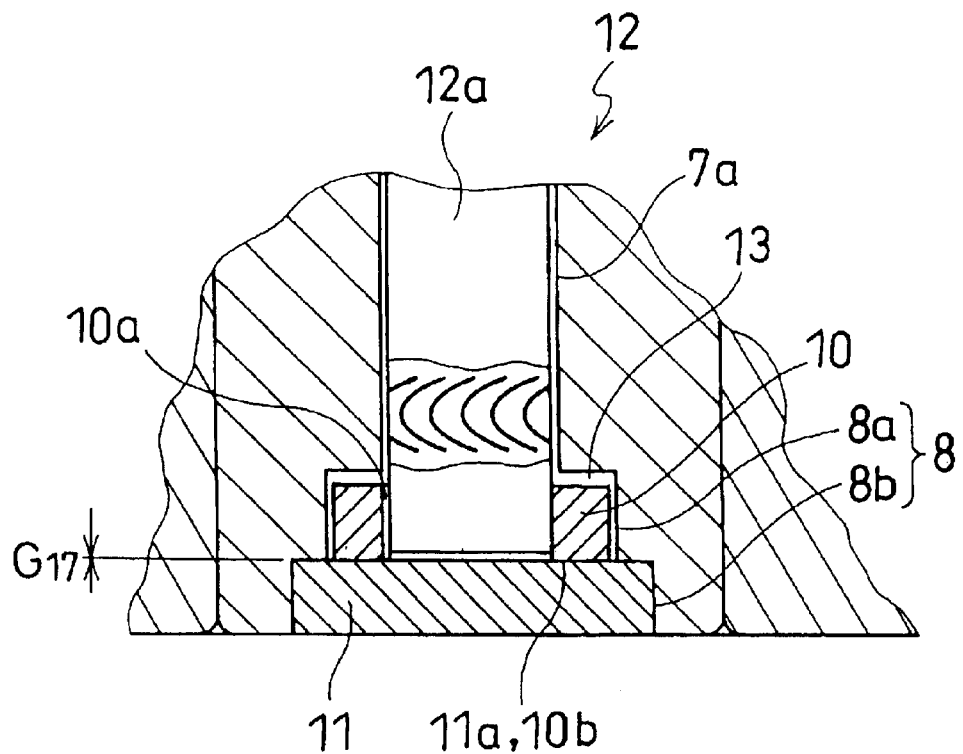
FIG. 21 is a cross sectional view showing the spindle motor of FIG. 20 at rest.
Figure 22:
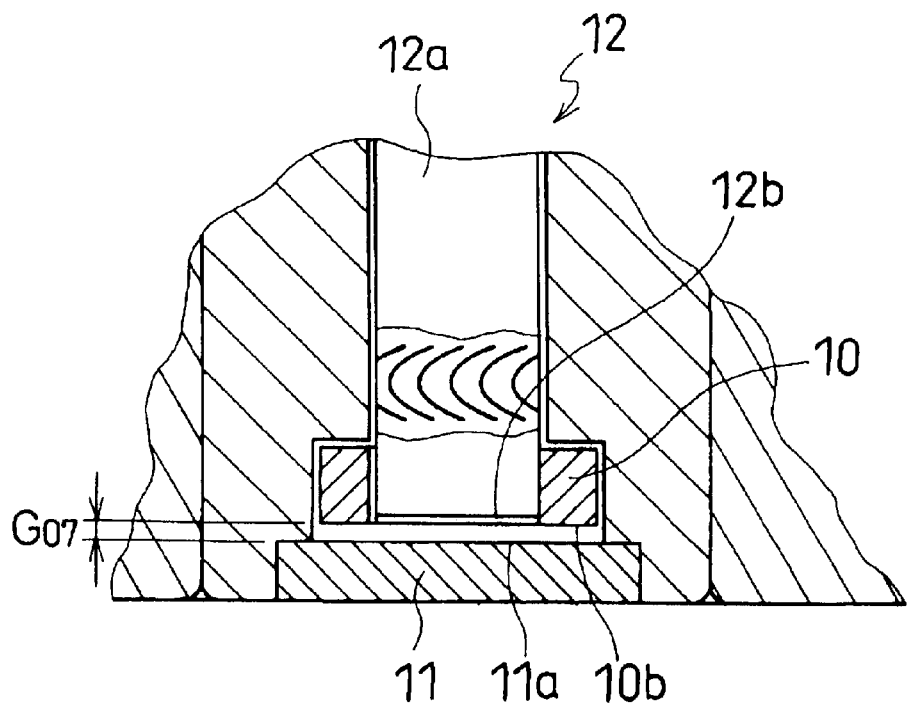
FIG. 22 is a cross sectional view showing the spindle motor of FIG. 20 in the state of being rotated.

The same parts as in FIGS. 20 to 22 are designated by the same reference numerals and the description thereof will be omitted as appropriate.

In the spindle motor 1A (a spindle motor for driving magnetic disks), a rotor 4 is provided with a magnet 5 facing toward the stator 3 provided on the flange 2 as shown in FIG. 1.

The flange 2 is generally constructed of a flange body 6 formed of aluminum or of stainless material holding the stator 3, and a sleeve 7 to be press-fitted into a hole (sleeve fitting hole 6a) formed on the flange body 6.

The flange body 6 generally comprises a cylindrical central cylindrical portion 20 having the sleeve fitting hole 6a, and a frame 21 provided on the proximal side of the central cylindrical portion 20 so as to extend radially outwardly.

The frame 21 generally comprises an annular base portion 22 integrally extending from the central cylindrical portion 20, a cylindrical outer peripheral wall portion 23 extending upwardly from the outer peripheral edge of the base portion 22, and an extension 24 extending radially outwardly from the upper end of the outer peripheral wall 23, and there is provided an annular space 25 between the central cylindrical portion 20 and the outer peripheral wall 23.

The stator 3 comprises a stator stack 27 and a coil 28 wound by the stator stack 27, and disposed in the annular space 25 with the stator stack 27 supported by the outer peripheral surface of the central cylindrical portion 20. The coil 28 is connected to the outer circuit via the connector 30 to which the outgoing line 29 is connected. In FIG. 1, the reference numeral 31 designates a sealing member.

The rotor 4 generally comprises a hub 32 formed of aluminum or stainless materials, and a shaft 12 fixed to the hub 32.

The hub 32 has a cup shaped configuration with three steps with their opened sides down in such a manner that the diameters of which sequentially increases from the top toward the bottom. Hereinafter, these cylindrical bodies are referred to as the first, the second, and the third hub cylindrical bodies 32a, 32b, 32c, in ascending order for the sake of convenience.

The shaft 12 is fitted to the hole 34 formed on the bottom of the first hub cylindrical body 32a.

A magnetic disk 36 is fitted on the outer peripheral surface of the outer peripheral wall 35 of the first hub cylindrical body 32a, and the first hub cylindrical body 32a is formed with a female screw 37 for fixing the cover for holding the magnetic disk 36 on the outer peripheral wall 35 thereof. The first hub cylindrical body 32a is formed with a plurality of holes 39 on the outer peripheral wall 35 along the circumference thereof, so that a balance weight 40 can be selectively mounted to these holes 39.

As shown in FIG. 1 and FIG. 2, a plurality of rows of grooves 15 are formed on the inner peripheral wall of the sleeve body 9 (sleeve hole 7a), and a plurality of rows of grooves (not shown) are formed on the end portion of the annular body 10 that touches the wall surface of the annular stepped portion 8 of the sleeve body 9, and the portion that touches the annular body 10 of the counter plate 11. Oil 14 is filled and reserved in the gap between the sleeve 7 including the groves 15 and the shaft 12, and in the grooves that are not shown in the figure. In this embodiment, the shaft 12 is constructed of a shaft body 12a that is a body of the shaft, and an annular body 10.

The dynamic pressure generated by the pumping action in association with rotation of the shaft 12 forces a fluid layer to be formed between the sleeve 7 and the shaft 12, whereby the shaft 12 rises with respect to the counter plate 11 and the shaft 12 rotates with respect to the sleeve 7 via a fluid layer as shown in FIG. 3. In other words, the fluid dynamic bearing 13 forms a fluid layer by the dynamic pressure as described above to form a gap between the shaft 12 and the counter plate 11 (stationary portion) to support a thrust load of the shaft 12 (in other words, the counter 11 supports a thrust load applied downwardly of the shaft 12 (in the direction of the arrow D in FIG. 1) and the ceiling wall of the medium diameter hole portion 8a supports a thrust load applied upwardly of the shaft 12 (annular body 10) (in the direction of the arrow U in FIG. 1), and a radial load of the shaft 12 is supported by the portion of the sleeve 7 where the sleeve hole 7a is formed.

The inner peripheral surface of the annular body 10 is formed with one or more fluid circulating groove 10a so as to facilitate circulation of the fluid. The annular body 10 slightly projects toward the counter plate 11 with respect to the shaft 12, so as to facilitate inflow and outflow of fluid from and to the fluid circulating groove 10a. It is also possible to provide the annular body 10 so as not to project toward the counter plate 11 with respect to the shaft body 12a to form a flat surface (or to be flush with the shaft body 12a).

The annular body 10 of the shaft 12 is disposed at the medium diameter annular hole 8a, that is, between the wall surface of the medium diameter annular hole 8a that faces in the axial direction (the upper side in FIG. 1) and the counter plate 11, so that the movement (vertical movement in FIG. 1) of the shaft 12 is controlled via the annular body 10.

The central position of the end surface 12b of the shaft body 12a is press-fitted with a ball (projection) 51 formed from ceramic. The ball 51 is provided in such a manner that the tip portion (not designated by the reference numeral) comes to the position higher than the end surface 10b of the annular body 10.

The position to which the ball 51 is mounted is not limited to the central position of the end surface 12b of the shaft body 12a, but it may be any positions other than the central position as far as it is on the end surface 12b of the shaft body 12a. There may be provided a plurality of balls 51. When a plurality of balls 51 are provided, it is preferably to arrange the plurality of balls 51 so that a load of the shaft 12 can be supported in a balanced manner.

The ball 51 is provided in such a manner that the tip portion thereof comes to the position higher than the end surface 10b of the annular body 10. More specifically, the projection measurement h of the ball 51 from the end surface 12b of the shaft body 12a or the height ht of the ball 51 is determined as follows.

Figure 4:
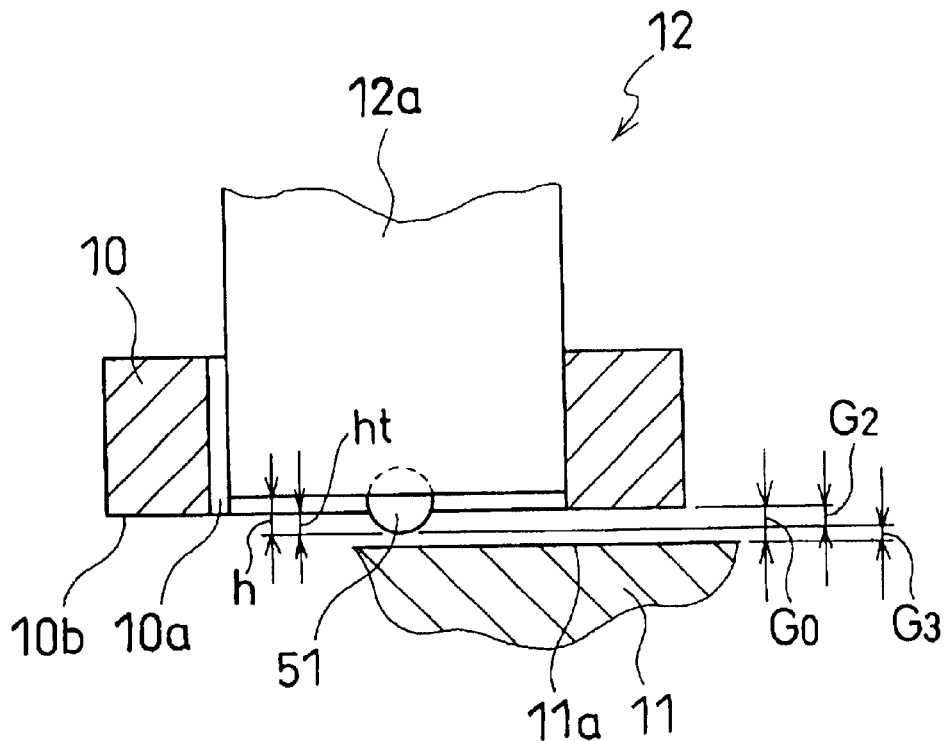
FIG. 4 is a cross sectional view explaining the setting of the height of the ball shown in FIG. 1.

The distance G2, the distance G3, and the distance G0 shown in FIG. 4 are determined as follows, and the projection measurement h or the height ht of the ball 51 is determined so that the sum of the distance G2 and the distance G3 is equal to the distance G0; (G2+G3=G0).

(1) The distance G2: The axial distance between the end surface 10b of the annular body 10 and the upper surface 11a of the counter plate 11 when the tip portion of the ball 51 touches the upper portion 11a of the counter plate 11 facing toward the shaft 12 with the shaft 12 (rotor 4) remained at rest. FIG. 4 is a cross section taken when the shaft 12 is being rotated, and the distance G2 shown in FIG. 4 is marked just for the sake of convenience.

(2) The distance G3: The axial distance between the tip portion of the ball 51 and the upper surface 11a of the counter plate 11 when the shaft 12 is rotated at a specified rotational speed.

(3) The distance G0: The axial distance between the end surface 10b of the annual body 10 and the upper surface 11a of the counter plate 11 when the shaft 12 is rotated at a specified rotational speed.

In this embodiment, a ball 51 is provided on the end surface 12b of the shaft body 12a in such a manner that the tip portion of the ball 51 comes to the position higher than the end surface 10b of the annual body 10 as described above. In this arrangement, when the shaft 12 is at rest, the ball 51 abuts against the upper portion 11a of the counter plate 11, and the end surface 10b of the annual body 10 is brought into a state of being raised from the upper surface 11a of the counter plate 11, so that the situation in which the end surface 10b of the annular body 10 and the upper surface 11a of the counter plate 11 are brought into almost fully touch each other, which could be occurred in the related art described above, can be avoided. Therefore, a specified gap is formed between the end surface 10b of the annular body 10 and the upper surface 11a of the counter plate 11, and thus the circulation speed of a fluid is increased when rotation is started. As a consequent, a fluid layer is quickly formed and thus the shaft 12 rises quickly and sufficiently.

As described above, when the shaft 12 is at rest, the ball 51 abuts against the upper surface 11a of the counter plate 11, and the end surface 10b of the annular body 10 is brought into a state of being raised from the upper surface 11a of the counter plate 11, and the shaft 12 is raised sufficiently and quickly. Therefore, a fluid circularity blocking action caused by adhesion in the tightly sticked state or by a small clearance, which could be occurred in the related art described above, can be avoided, and generation of scratch caused by starting rotation in the tightly sticked state can be positively prevented.

Since the ball 51 is formed of porous ceramic that can impregnate oil, lubricity can be further improved.

In the spindle motor disclosed in Japanese Unexamined Patent Application Publication No. 11-311245, as shown in FIG. 1 and the paragraphs [0016] to [0017] of the same publication, in a state in which the free end of the shaft body touches the closed end surface (upper side in the figure) of the cylindrical member, a gap is formed between the end surface of the cylindrical member on the side of the opening and the upper surface of the support (lower side in the figure), so that the free end of the shaft body is configured into a curved surface. In this spindle motor, the curved surface (projecting portion) is formed of the same material as the cylindrical member. Therefore, manufacturing of the shaft body is constrained, which results in lowering of versatility correspondingly. On the other hand, in this embodiment, since the projection (ball 51) is provided separately from the member on which the projection is provided (shaft boy 12a), the member on which the projection is provided (shaft body 12a) may be used widely to various types of the motor, thereby improving productivity correspondingly.

Figure 5:
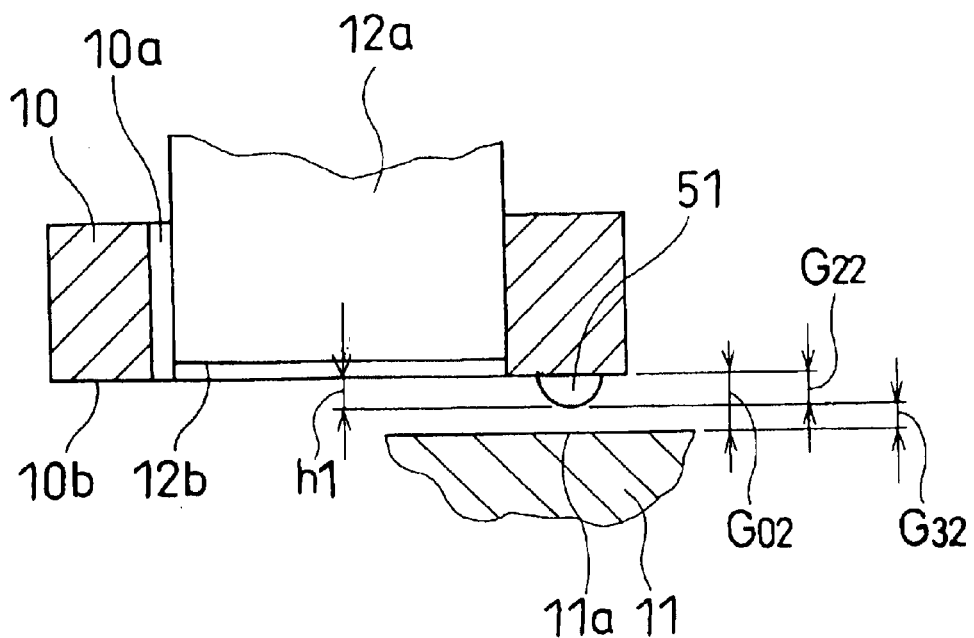
FIG. 5 is a cross sectional view showing the second embodiment of the present invention.

In the embodiment described above, there is shown an example in which the ball 51 is provided on the end surface 12b of the shaft body 12a. Alternatively, as shown in FIG. 5, the ball 51 may be press-fitted to the end surface 10b of the annular body 10 (second embodiment). The second embodiment corresponds to the third aspect of the present invention. In the second embodiment, the height h of the ball 51 (dimension of the annular body 10 projecting from the end surface 10b) is specifically determined as follows.

The distance G22, the distance G32, and the distance G02 shown in FIG. 5 are determined as follows, and the height h1 of the ball 51 is determined so that the sum of the distance G22 and the distance G32 is equal to the distance G02; (G22+G32=G02).

(1) The distance G22: The axial distance between the end surface 10b of the annular body 10 and the upper surface 11a of the counter plate 11 when the tip portion of the ball 51 touches the upper surface 11a of the counter plate 11 with the shaft 12 remained at rest. FIG. 5 is a cross section taken when the shaft 12 is being rotated, and the distance G22 shown in FIG. 5 is marked just for the sake of convenience.

(2) The distance G32: The axial distance between the tip portion of the ball 51 and the upper surface 11a of the counter plate 11 when the shaft 12 is rotated at a specified rotational speed.

(3) The distance G02: The axial distance between the end surface 10b of the annular body 10 and the upper surface 11a of the counter plate 11 when the shaft 12 is rotated at a specified rotational speed.

In the second embodiment, when the shaft 12 is remained at rest, the ball 51 abuts against the upper surface 11a of the counter plate 11, and as in the first embodiment, the end surface 10b of the annular body 10 is brought into a state of being raised from the upper surface 11a of the counter plate 11, so that the situation in which the end surface 10b of the annular body 10 and the upper surface 11a of the counter plate 11 are brought into almost fully touch each other can be avoided. Therefore, a fluid circularity blocking action that could be occurred in the related art can be avoided and generation of scratch caused by starting rotation in the tightly sticked state can be positively prevented.

Figure 6:
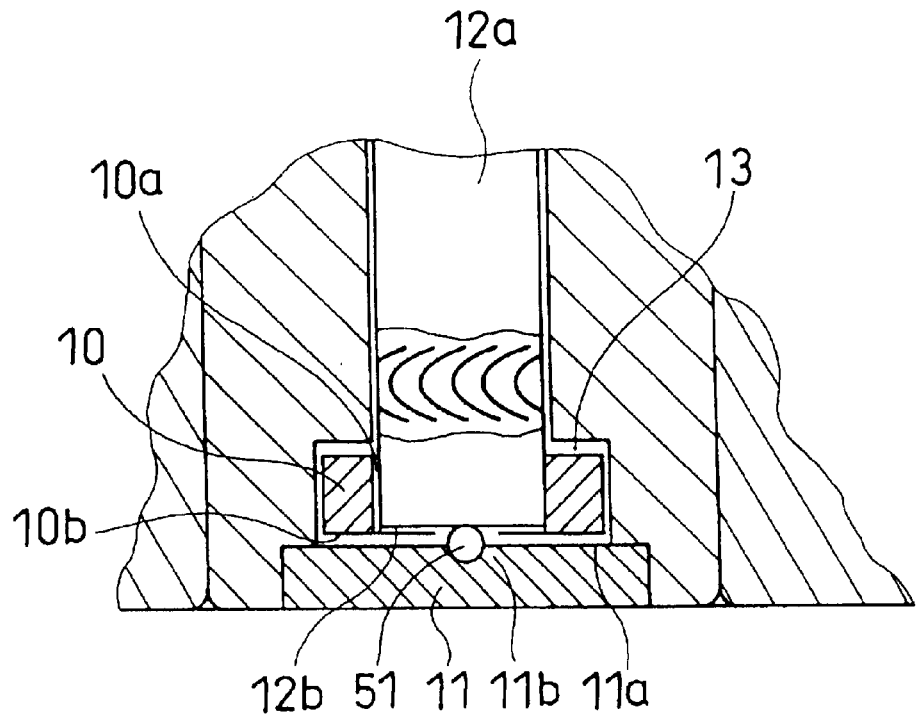
FIG. 6 is a cross sectional view of the spindle motor according to the third embodiment remained at rest.
Figure 7:
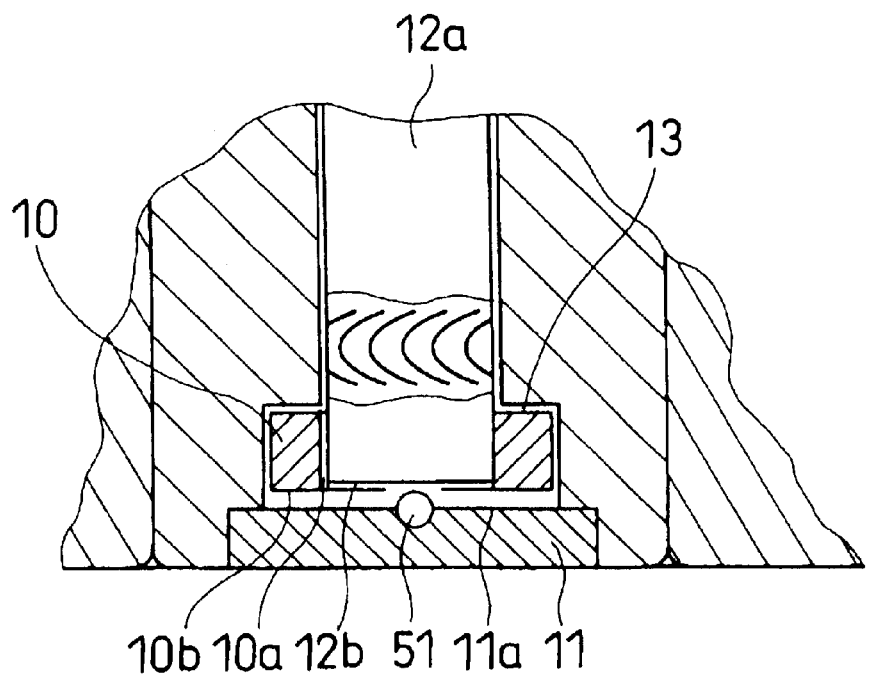
FIG. 7 is a cross sectional view showing the spindle motor shown in FIG. 6 in the state of being rotated.
Figure 8:
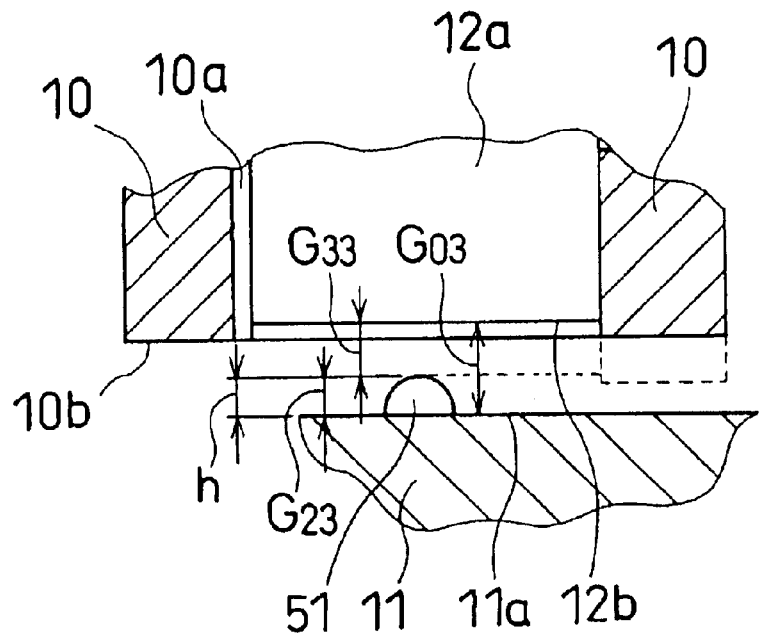
FIG. 8 is a cross sectional view explaining the setting of the height of the ball shown in FIG. 6.

In the first and second embodiment, there is shown an example in which the ball 51 is provided on the shaft 12 side (the shaft body 12a or the annular body 10). Alternatively, as shown in FIGS. 6 to 8, the ball 51 may be press-fitted to the portion 11b on the upper surface 11a of the counter plate 11 facing toward the end surface 12b of the shaft body 12a (the surface on the stationary portion facing toward the shaft body) (third embodiment). The third embodiment corresponds to the fifth aspect of the present invention. In the third embodiment the height h of the ball 51 (dimension projecting from the upper surface 11a of the counter plate 11) is determined to be larger than the dimension from the end surface 12b of the shaft body 12a to the end 10b of the annular body 10, and specifically it is determined as follows.

The distance G23, the distance G33, and the distance G03 shown in FIG. 8 are determined as follows, and the height h of the ball 51 is determined so that the sum of the distance G23 and the distance G33 is equal to the distance G03; (G23+G33=G03).

(1) The distance G23: The axial distance between the end surface 10b of the annular body 10 and the upper surface 11a of the counter plate 11 when the tip portion of the bail 51 touches the end surface 12b of the shaft body 12a with the shaft 12 remained at rest. FIG. 8 is a cross section taken when the 12 is being rotated, and the distance G23 shown in FIG. 8 is marked just for the sake of convenience.

(2) The distance G33: The axial distance between the tip portion of the ball 51 and the end surface 12b of the shaft body 12a when the shaft 12 is rotated at a specified rotational speed.

(3) The distance G03: The axial distance between the end surface 12b of the shaft body 12a and the upper surface 11a of the counter plate 11 when the shaft 12 is rotated at a specified rotational speed.

In the third embodiment, when the shaft 12 is remained at rest, the ball 51 abuts against the end surface 12b of the shaft body 12a, and as in the first embodiment, the end surface 10b of the annular body 10 is brought into a state of being raised from the upper surface 11a of the counter plate 11, so that the situation in which the end surface 10b of the annular body 10 and the upper surface 11a of the counter plate 11 are brought into almost fully touch each other can be avoided. Therefore, a fluid circularity blocking action that could be occurred in the related art can be avoided and generation of scratch caused by starting rotation in the tightly sticked state can be positively prevented.

Figure 9:
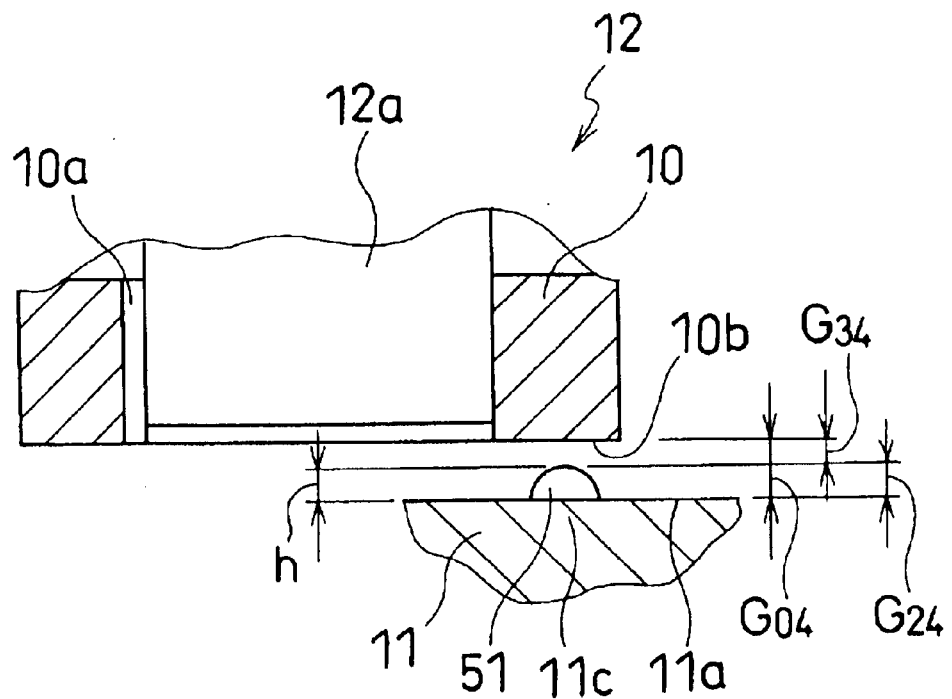
FIG. 9 is a cross sectional view explaining the setting of the height of the ball for the spindle motor according to the fourth embodiment of the present invention.

In the third embodiment, there is shown an example in which the ball 51 is press-fitted into the portion on the surface 11b of the counter plate facing toward the shaft body (the portion on the surface of the stationary portion facing toward the shaft body). Alternatively, as shown in FIG. 9, the ball 51 may be press-fitted to the portion 11c on the upper surface 11a of the counter plate 11 facing toward the end surface 10b of the annular body 10 (the portion on the surface of the stationary portion facing toward the annular body) (fourth embodiment). The fourth embodiment corresponds to the fourth aspect of the present invention. In the fourth embodiment, the height h of the ball 51 (dimension projecting from the upper surface 11a of the counter plate 11) is determined as follows.

The distance G24, the distance G34, and the distance G04 shown in FIG. 9 are determined as follows, and the height h1 of the ball 51 is determined so that the sum of the distance G24 and the distance G34 is equal to the distance G04; (G24+G34=G04).

Figure 10:
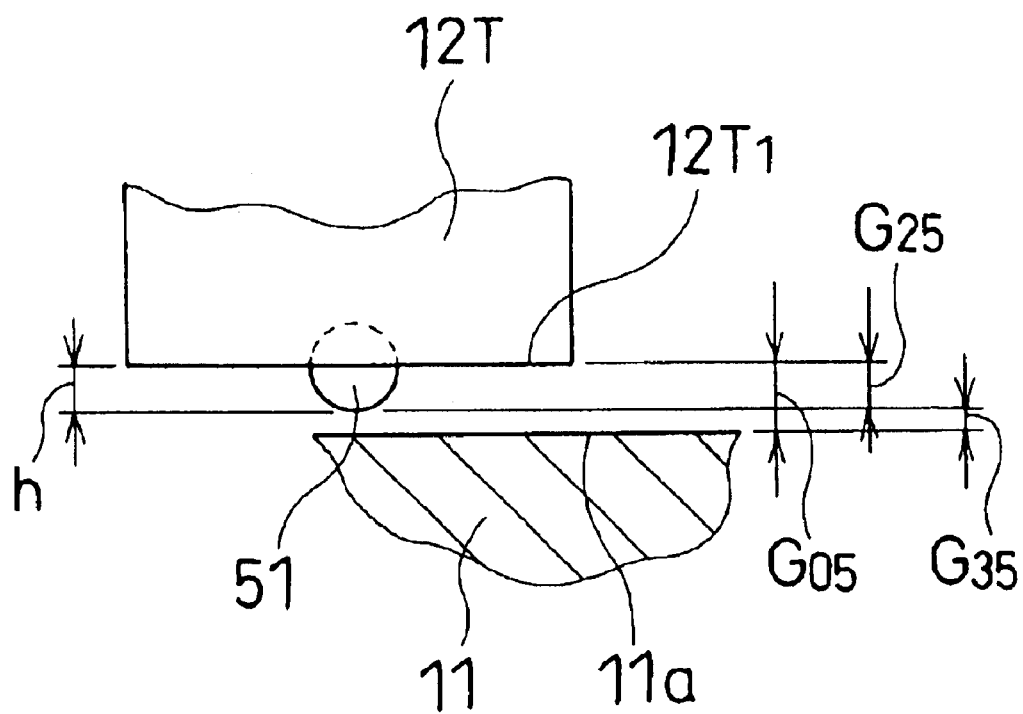
FIG. 10 is a cross sectional view explaining the setting of the ball for the spindle motor according to the fifth embodiment.

(1) The distance G24: The axial distance between the end surface 10b of the annular body 10 and the upper surface 11a of the counter plate 11 when the tip portion of the ball 51 touches the surface 10b of the annular body 10 with the shaft 12 remained at rest. FIG. 9 is a cross section taken when the shaft 12 is being rotated, and the distance G24 shown in FIG. 10 is marked just for the sake of convenience.

(2) The distance G34: The axial distance between the tip portion of the ball 51 and the end surface 10b of the annular body 10 when the shaft 12 is rotated at a specified rotational speed.

(3) The distance G04: The axial distance between the end surface 10b of the annular body 10 and the upper surface 11a of the counter plate 11 when the shaft 12 is rotated at a specified rotational speed.

In the fourth embodiment, when the shaft 12 is remained at rest, the ball 51 abuts against the end surface 10b of the annular body 10, and as in the first embodiment, the end surface 10b of the annular body 10 is brought into a state of being raised from the upper surface 11a of the counter plate 11, so that the situation in which the end surface 10b of the annular body 10 and the upper surface 11a of the counter plate 11 are brought into almost fully touch each other can be avoided. Therefore, a fluid circularity blocking action that could be occurred in the related art can be avoided and generation of caused by starting rotation in the tightly sticked state can be positively prevented.

In the first to fourth embodiments, there is shown an example in which the shaft 12 constructed of the shaft body 12 and the annular body 10 is used. Alternatively, as shown in FIG. 10, it is also possible to use a shaft that is not provided with the annular body 10 hereinafter referred to as a single shaft for the sake of convenience) 12T, and the ball 51 is press-fitted into the end surface 12T1 of the single shaft 12T (fifth embodiment). The fifth embodiment corresponds to the first aspect of the present invention. In the fifth embodiment, the height h1 of the ball 51 (dimension of the single shaft 12T projecting from the end surface 12T1) is determined as follows.

The distance G25, the distance G35, and the distance G05 shown in FIG. 10 are determined as follows, and the height h1 of the ball 51 is determined so that the sum of the distance G25 and the distance G35 is equal to the distance G05; (G25+G35=G05).

(1) The distance G25: The axial distance between the end surface 12T1 of the shingle shaft 12T and the upper surface 11a of the counter plate 11 when the tip portion of the ball 51 touches the upper surface 11a of the counter plate 11 with the shaft 12 remained at rest. FIG. 10 is a cross section taken when the shaft 12 is being rotated, and the distance G25 shown in FIG. 9 is marked just for the sake of convenience.

(2) The distance G35: The axial distance between the tip portion of the ball 51 and the upper surface 11a of the counter plate 11 when the single shaft 12T is rotated at a specified rotational speed.

(3) The distance G05: The axial distance between the end surface 12T1 of the single shaft 12T and the upper surface 11a of the counter plate 11 when the single shaft 12T is rotated at a specified rotational speed.

In the fifth embodiment, when the single shaft 12T is remained at rest, the ball 51 abuts against the upper surface 11a of the counter plate 11, and as in the first embodiment, the end surface 12T1 of the single shaft 12T is brought into a state of being raised from the upper surface 11a of the counter plate 11, so that the situation in which the end surface 12T1 of the single shaft 12T1 and the upper surface 11a of the counter plate 11 are brought into almost fully touch other can be avoided.

Therefore, a fluid circularity blocking action that could be occurred in the related art can be avoided. Therefore, a fluid circularity blocking action that could be occurred in the related art can be avoided and generation of scratch caused by starting rotation in the tightly sticked state can be positively prevented.

In the fifth embodiment, there is shown an example in which the ball 51 is press-fitted to the end 12T1 of the single shaft 12T. Alternatively, it is also possible press-fit the ball 51 into the upper surface 11a of the counter plate 11 so that the portion on the tip side projects from the upper surface 11a of the counter plate 11 (corresponding to the invention according to the claim 1 or claim 2).

In each embodiment described above, there is shown an example in which the ball 51 is press-fitted into the member on which the ball 51 is to be provided (shaft body 12a, the annular body 10, or the counter plate 11). However, it is also possible to fix the ball 51 on the member on which the ball 51 is to be provided (shaft body 12a, the annular body 10 or the counter plate 11) with fixing means such as adhesives. In this case, the fixing means such as adhesives should be compatible with the fluid.

In each of the embodiment described above, there is shown an example in which the projection is a ball 51 formed of ceramic. Alternatively, it may be a steel ball.

Figure 11:
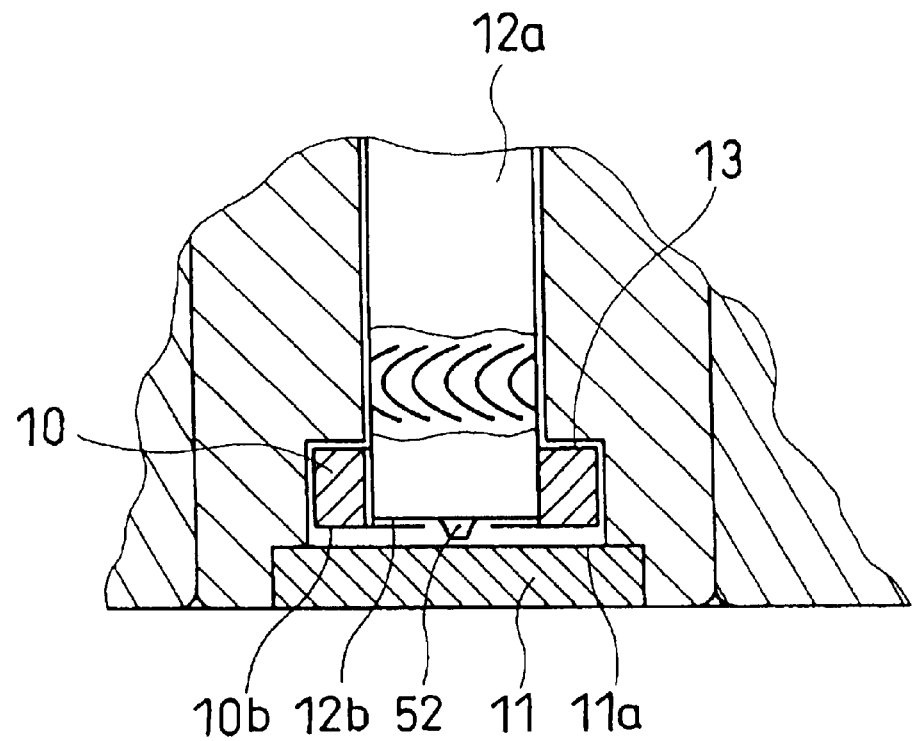
FIG. 11 is a cross sectional view showing an example of the present invention in which a conical projection is provided on the shaft body.

The projection is not limited to the spherical shape (ball 51) described in the above-described embodiments, but it may be a conical projection as shown in FIG. 11, or may be other shapes such as a shaft shape and tapered shape. When the tapered shape is employed, the tip portion is preferably formed into a convex curved shape so as not to set down the mated surface that touches it.

Figure 12:
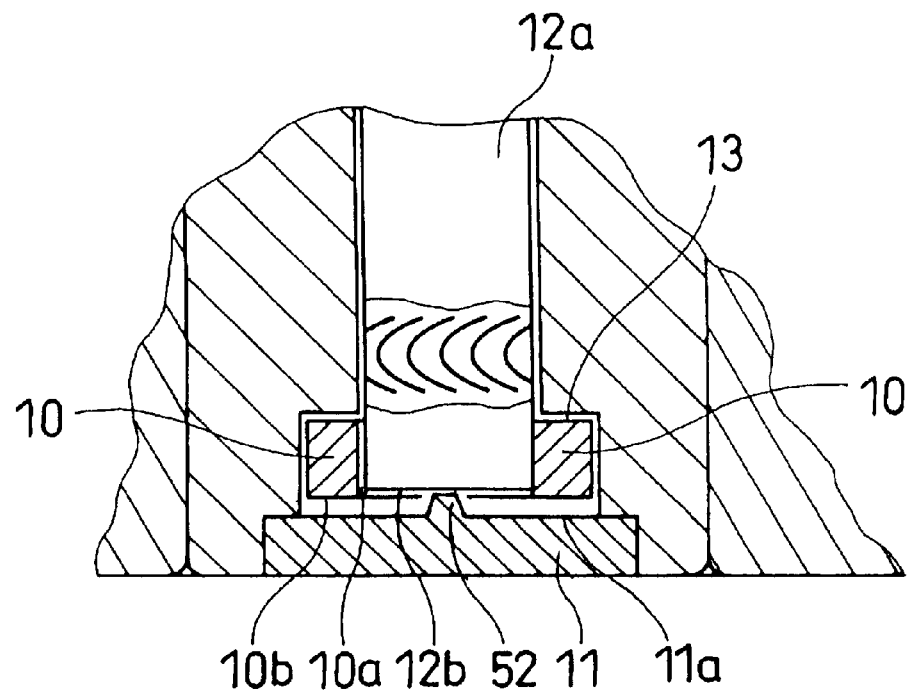
FIG. 12 is a cross sectional view showing an example of the present invention in which a conical projection is provided an the counter plate.

In addition, in the embodiments described above, there is shown an example in which the projection (ball 51) is formed separately from the member on which the projection (ball 51) is provided (shaft body 12a, annular body 10 or the counter plate 11). Alternatively, the projection may be formed integrally with the member on which the projection is provided (shaft body 12a, annular body 10 or the counter plate 11). For example, as shown in FIG. 12, it is also possible to form the projection 52 of conical shape on the upper surface 11a of the counter plate 11.

In the embodiments described above, there are shown examples in which the ball 51 is press-fitted into the member (shaft body 12a, annular body 10 or counter plate 11) or fixed thereon with the fixing means such as adhesives. As an alternative thereto, as shown in FIGS. 13–19, the projection may be a member made of a high hardness material formed by the sputtering (corresponding to claims 10 to 12).

Figure 13:
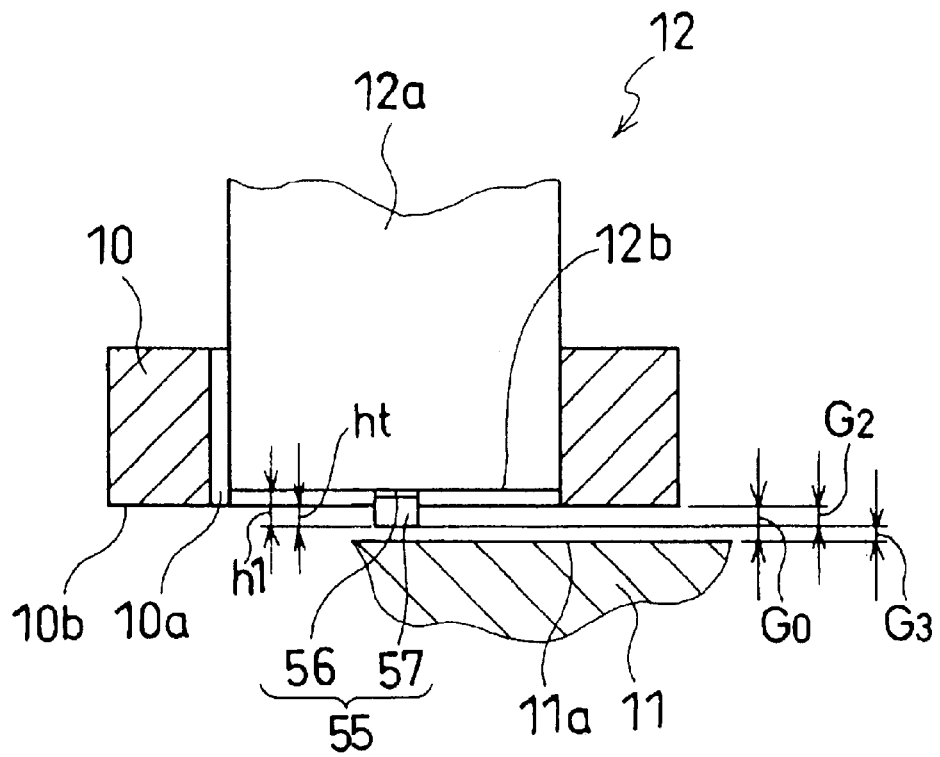
FIG. 13 is a cross sectional view showing the six embodiment of the present invention.

In the sixth embodiment, as shown in FIG. 13, a single disk-like projection 55 is provided at the center of the end surface 12b of the shaft body 12a. The diameter and the height h1 of the projection 55 is 0.5 mm to 5 mm and 2 $\mu$m, respectively. The projection 55 is composed of a base member 56 containing silicon or chromium as a main component and being 0.5 $\mu$m in its height and a secondary member made of a high hardness material 57 (hereinafter a secondary member 57) placed thereon and being 1.5 $\mu$m in its height and both of the members are formed by the sputtering. The secondary member 57 is made of DLC, which is formed by being crystallized in an atmosphere of hydrogen or methane, characterized in that the hardness or smoothness thereof is more superior to amorphous carbon (crystal body made by which carbon is crystallized in a vacuum).

As described above, the height h1 of the projection 55 is determined to be 2 $\mu$m and the tip portion thereof is made to be higher than the end surface 10b of the annular body 10. To be specific, the ball 51 as shown in FIG. 4 is replaced by the projection 55, and each specific measurement is determined as same as the first embodiment. And, the measurement ht projected from the end surface 12b of the shaft body 12a (hereinafter projection measurement of the projection 55) is determined in a state that the height h1 of the projection 55 is set to be 2 $\mu$m. That is, when considering the projection measurement ht or the height h1 of the projection 55 (2 $\mu$m), the sum of the distance G2 and the distance G3 is equal to the distance G0 (G2+G3=G0).

In the sixth embodiment thus constructed, when the shaft 12 remains at rest, the projection 55 abuts against the upper surface 11a of the counter plate 11, and the end surface 10b of the annular body 10 is brought into a state of being raised from the upper surface 11a of the counter plate 11. Moreover, since the shaft 12 is sufficiently raised to a specific level and in a quick motion, problems occurred in prior arts can be effectively prevented. That is, an adhesion occurred in a cohered state or a fluid circularity blocking action due to a small aperture can be prevented. Moreover, scratches caused when a rotor is started to rotate in the cohered state can be prevented in a certain manner.

In addition, durability is improved due to that the secondary member 57 of the projection 55 is made by DLC which is characteristically superior in a high hardness and a surface smoothness. In this case, because the sputtering is not a complicated method, obtaining of the projection 55 is easy. For example, by forming an aperture on a stainless mask and conducting the sputtering thereover, the projection can be formed. Alternatively, in case that a plurality of projections are formed at a time, apertures corresponding to the projections should be made on the mask, then a plurality of projections can be formed by conducting only one sputtering. In addition, a conical or a hemisphere projection can be formed by adjusting the shape of the mask.

Further, the projection 55 provided at the end surface 12b of the shaft body 12a comprises the base member 56 containing silicon or chromium as a main component and secondary member 57 made of a high hardness material placed thereon, and both of the members are formed by the sputtering. That is, since the base member 56 is placed between the end surface 12b of the shaft body 12a and the secondary member 57, the secondary member 57 and the end surface 12b can be made a certain attachment.

Because the projection 55 is provided at the center of the end surface 12b of the shaft body 12a, a staring torque can be reduced. However, the portion at where the projection 55 is provided is not limited to the center of the end surface 12b of the shaft body 12a. Instead, the projection 55 can be provided at any point as long as that is at the end shaft 12b of the shaft body 12a. Alternatively, the projection 55 can be provided in a plural number. In this case a plurality of the projections 55 should be provided in such a manner that a load of the shaft 12 is most effectively supported.

Furthermore, since the projection 55 abuts against the upper surface 11a of the counter plate 11 giving more gap between the upper surface 11a of the counter plate 11 and the end surface 12b of the shaft body 12a, more amount of oil can be filled and reserved therein.

Still further, in the sixth embodiment there is shown example in which the height h1 of the projection 55 is set to be 2 $\mu$m, but this is not limited thereto. Instead, the height h1 can be set within the range from 0.02 $\mu$m to 5 $\mu$m, and this can be also applied to the seventh to twelfth embodiments described hereinafter.

And, in the sixth embodiment there is shown example in which the secondary member 57 of the projection 55 is made of DLC, but this is not limited thereto. Instead, the secondary member 57 can be made of amorphous carbon, and this can be applied to the seventh to twelfth embodiments described hereinafter.

Furthermore, in the sixth embodiment there is shown example in which the projection 55 comprises the base member 56 being 0.5 μm in its height and the secondary member 57 1.5 μm in its height, but this is not limited thereto. Instead, the projection 55 can be composed only of the secondary member 57 being 2.0 μm in its height without providing any of the base member 56. In this case the height of the secondary member 57 (or the projection 55) is not limited to 2.0 μm but can be set within the range from 0.02 μm to 5 μm (corresponding to claim 10), and this can be applied to the seventh to twelfth embodiments described hereinafter.

Figure 14:
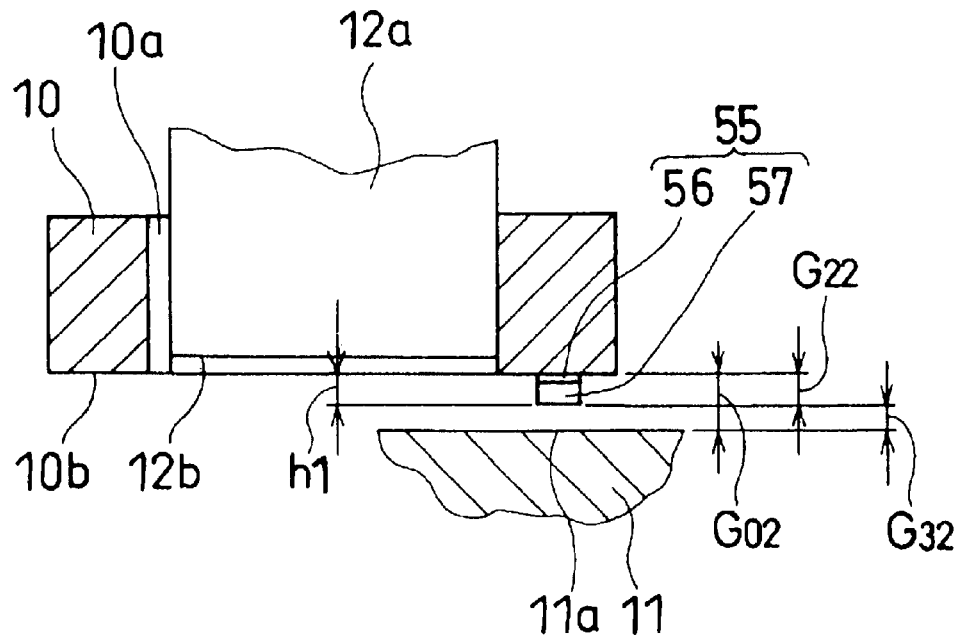
FIG. 14 is a cross sectional view showing the seventh embodiment of the present invention.

In the sixth embodiment (FIG. 13) there is also shown example in which the projection 55 is provided on the end surface 12b of the shaft body 12a, but this is not limited thereto. Instead, in the seventh embodiment as shown in FIG. 14, the projection 55 is provided on the end surface 10b of the annular body 10. In this seventh embodiment the height h1 of the projection 55 (projection measurement from the end surface 10b of the annular body 10) is set to be 2 μm. Moreover, in the seventh embodiment each measurement G 22, G 32 and G 02 is determined as same as the case of the second embodiment by replacing the ball 51 with the projection 55. That is, the sum of the distance G 22 and the distance G 32 is equal to the distance G 02 (G22+G32=G02).

Figure 15:
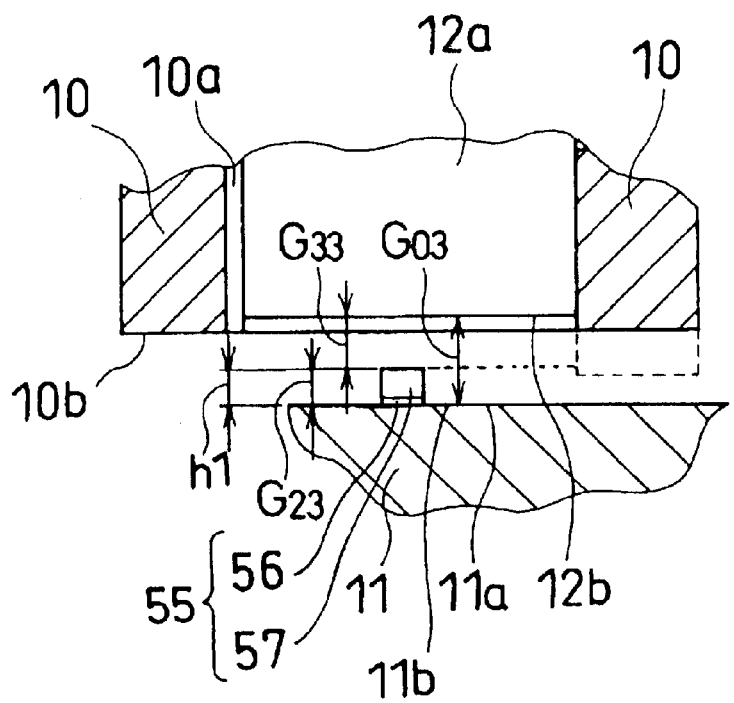
FIG. 15 is a cross sectional view showing the eighth embodiment of the present invention.

In the sixth and seventh embodiment there is shown example in which the projection 55 is provided on the side of the shaft 12 (shaft body 12a or annular body 10), but this is not limited thereto. Instead, as shown in FIG. 15 (corresponding to the eighth embodiment), the projection 55 can be provided on the surface 11b of the counter plate 11 facing the end surface 12b of the shaft body 12a. In the eighth embodiment the height h1 of the projection 55 (projection measurement from the upper surface 11a of the counter plate 11) is set to be 2 μm. Moreover, each measurement of G 23, G 33 and G 03 as shown in FIG. 15 is determined as same as the case of the third embodiment by replacing the ball 51 with the projection 55. That is, the sum of the distance G 23 and the distance G 33 is equal to the distance G 03 (G 23+G 33=G 03).

Figure 16:
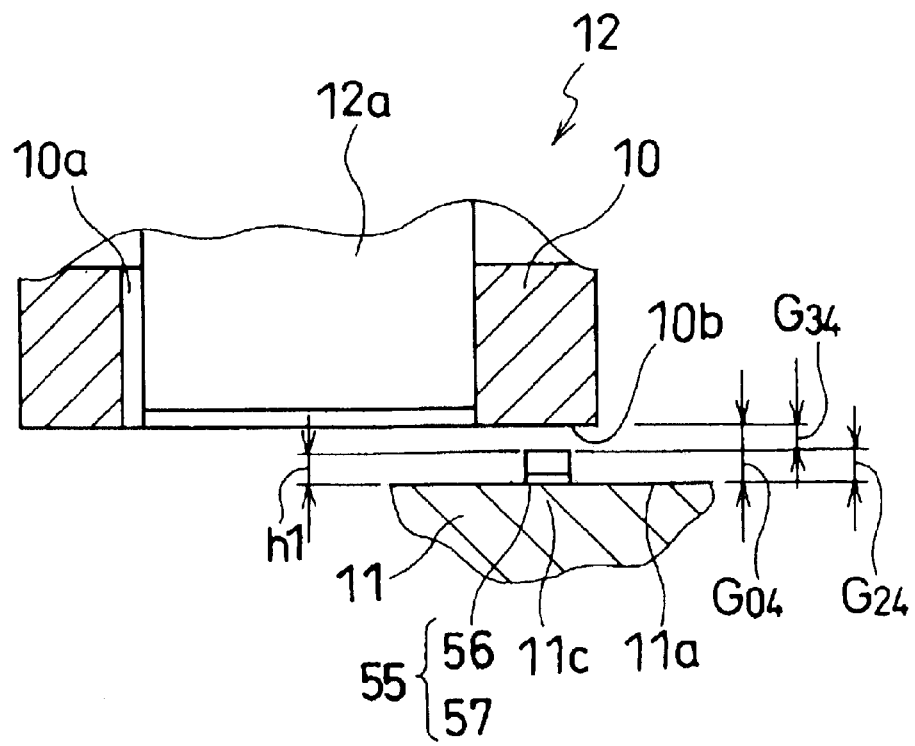
FIG. 16 is a cross sectional view showing the ninth embodiment of the present invention.

In the above eighth embodiment the projection 55 is provided on the surface 11b of the counter plate 11, but this is not limited thereto. Instead, as shown in FIG. 16 (corresponding to the ninth embodiment), the projection 55 can be provided on the portion 11c of the counter plate 11 facing the end surface 10b of the annular body 10. In the ninth embodiment the height h1 of the projection 55 (projection measurement from the upper surface 11a of the counter plate 11) is set to be 2 μm. Moreover, each measurement of G 24, G 34 and G 04 as shown in FIG. 16 is determined as same as the case of the forth embodiment by replacing the ball 51 with the projection 55. That is, the sum of the distance G 24 and the distance G 34 is equal to the distance G 04 (G24+G34=G04).

Figure 17:
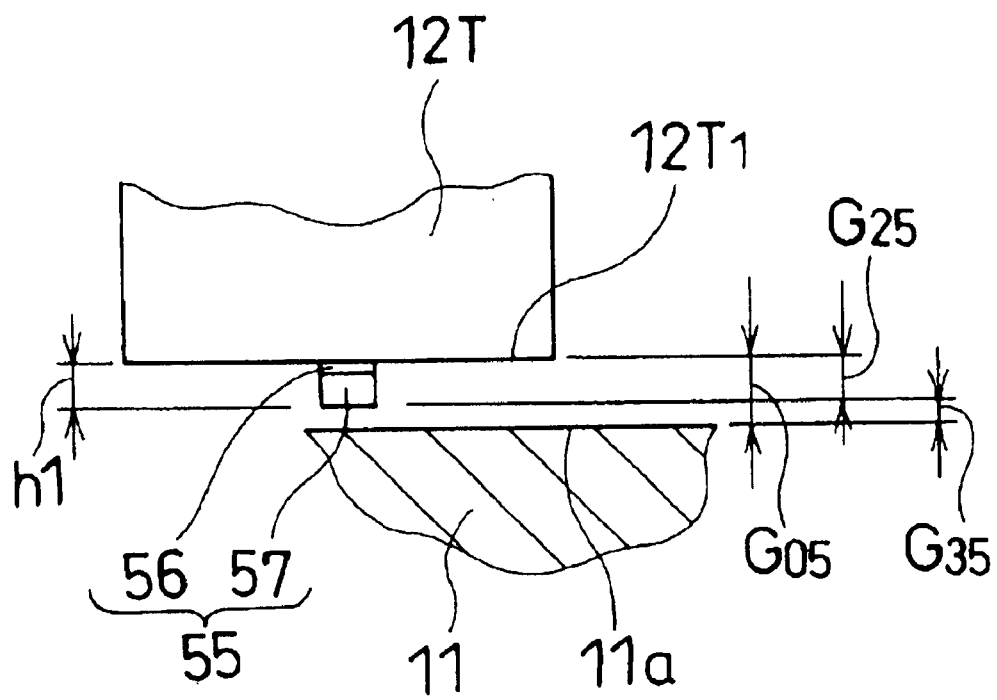
FIG. 17 is a cross sectional view showing the tenth embodiment of the present invention.

In the sixth to ninth embodiments that is shown example in which the shaft 12 is composed of the shaft body 12a and the annular body 10, but this is not limited thereto. Instead, as shown in FIG. 17 (corresponding to the tenth embodiment) the projection 55 can be provided on the end surface 12T1 of the singe shaft 12T meaning the shaft not having the annular body 10. In the tenth embodiment the height h1 of the projection 55 (projection measurement from the end surface 12T1 of the single shaft 12T) is set to be 2 μm. Moreover, each measurement of G 25, G 35 and G 05 as shown in FIG. 17 is determined as same as the case of the fifth embodiment by replacing the ball 51 with the projection 55. That is, the sum of the distance G 25 and the distance G 35 is equal to the distance G05(G25+G35=G05).

Figure 18:
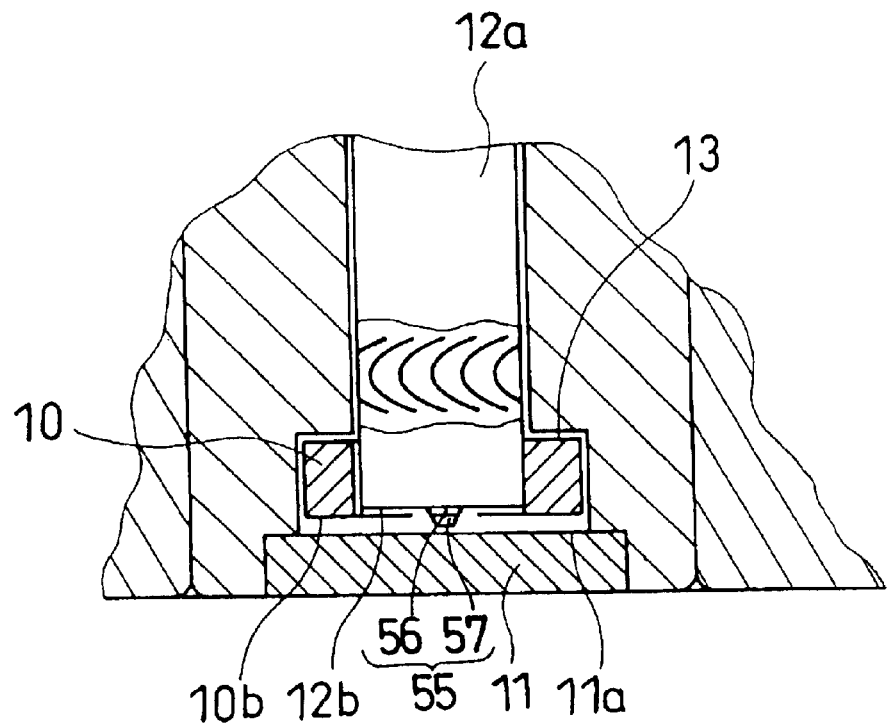
FIG. 18 is a cross sectional view showing the eleventh embodiment of the present invention.
Figure 19:
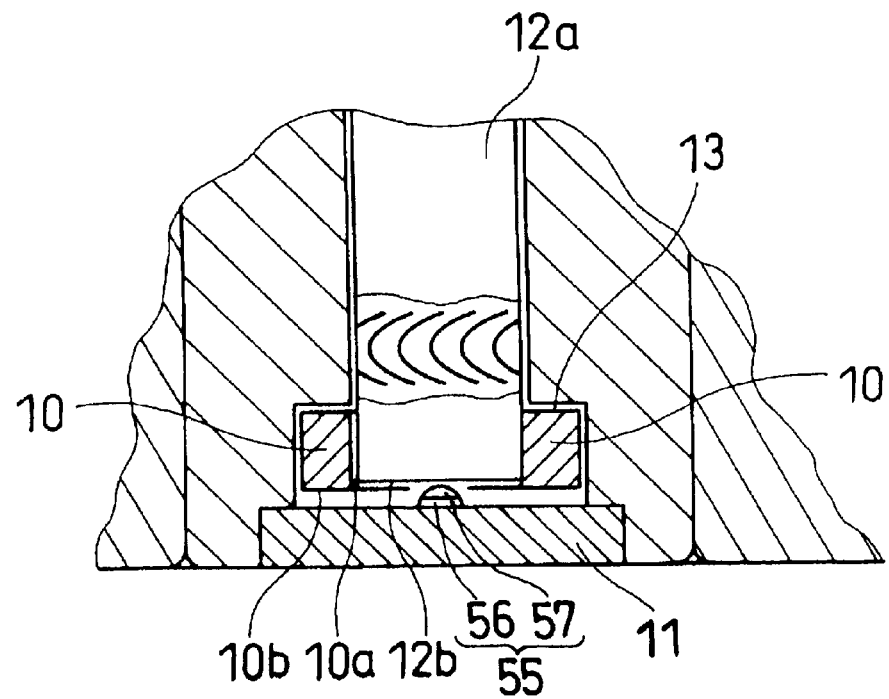
FIG. 19 is a cross sectional view showing the twelfth embodiment of the present invention.

Further, in the sixth to tenth embodiments there is shown example in which the projection 55 is plate-like shape, but this is not limited thereto. Instead, as shown in FIG. 18, the projection 55 can be conical shape or hemisphere shape as shown in FIG. 18 (corresponding to the eleventh embodiment) and FIG. 19 (corresponding to the twelfth embodiment), respectively.

According to the present invention, when the rotating member is at rest, a gap is generated between the opposing generally flat end surfaces of the fluid dynamic bearing by the abutment of the projection, and one of these opposing end surfaces is brought into a state of being raised from the other end surface, so that the situation in which both of the end surfaces are brought into almost fully touch each other can be avoided. Therefore, a fluid circularity blocking action that could be occurred in the related art can be avoided and generation of scratch caused by starting rotation in the tightly sticked state can be positively prevented.

What is claimed is:

1. A motor having a rotating member supported on a stationary portion via a fluid dynamic bearing supporting both of a thrust load and a radial load, comprising:
   one or more projections provided on one of the opposing generally flat surface at the end of the shaft to the fluid dynamic bearing each as a separate unit;
   characterized in that said one of more projections are capable of abutting against the other surface when said rotating member is at rest.

2. A motor as set forth in claim 1, characterized in that said one of the surfaces is an end surface of the shaft provided on said rotating member and said the other one of the surface is said portion on the surface of the stationary portion facing toward the end surface of the shaft, or said one of the surfaces is said portion on the surface of the stationary portion facing toward the end surface of the shaft and the other one of the surfaces is an end surface of the shaft.

3. A motor having a shaft fitted with an annular body on one end of the shaft body and a rotating member supported on the stationary portion via a fluid dynamic bearing for supporting both of a thrust load and a radial load,
   characterized in that one or more projections are provided on the end surface of said shaft body each as a separate unit, and;
   in that said projection is provided in such a manner that the tip portion thereof comes to the position higher than the end surface of the annular body.

4. A motor as set forth in claim 1, to characterized in that said projection is press-fitted to the member on which said projection is to be provided.

5. A motor as set forth in claim 1, to claim 7, characterized in that said projection has a spherical shape.

6. A motor as set forth in claim 1, characterized in that said projection is formed of ceramic.

7. A motor as set forth in claim 1, characterized in that said projection is a member made of a high hardness material formed by a sputtering.

8. A motor as set forth in claim 1, characterized in that said projection is formed of a base member containing silicon or chromium as a main component and a secondary member made of a high hardness material placed thereon, and both of said members are formed by the sputtering.

9. A motor as set forth in claim 7, characterized in that said member made of a high hardness material is amorphous carbon or Diamond-like Carbon.

10. A motor having a rotating member with a shaft that is supported on a stationary portion via a fluid dynamic bearing for supporting both of a thrust load and a radial load, comprising:

at least one projection on one of a first surface of the shaft of the rotating member and a second surface of the stationary portion opposing the first surface, wherein the at least one projection abuts against the other of the first and second surfaces when the rotating member is at rest.

* * * * *